(12) United States Patent
Löffler et al.

(10) Patent No.: US 6,475,112 B2
(45) Date of Patent: Nov. 5, 2002

(54) ENGINE TORQUE CONTROL SYSTEM BASED ON THE DYNAMIC BEHAVIOR OF A DRIVEN AUTOMATIC TRANSMISSION

(75) Inventors: Bernd Löffler, Ravensburg (DE); Peter Janssen, Meckenbeuren (DE)

(73) Assignee: ZF Batavia, L.L.C., Batavia, OH (US)

( * ) Notice: Subject to any disclaimer, the term of this patent is extended or adjusted under 35 U.S.C. 154(b) by 0 days.

(21) Appl. No.: 09/860,145

(22) Filed: May 17, 2001

(65) Prior Publication Data
US 2001/0044360 A1 Nov. 22, 2001

(30) Foreign Application Priority Data
May 19, 2000 (DE) .......................... 100 24 847

(51) Int. Cl.[7] .......................... B60R 41/12; G06F 17/00; G06F 19/00; G06F 7/00
(52) U.S. Cl. .......................... 477/45; 477/97; 477/109; 701/58
(58) Field of Search .......................... 477/45, 50, 97, 477/109, 110; 701/51, 58

(56) References Cited

U.S. PATENT DOCUMENTS

| 5,383,824 A | | 1/1995 | Runge et al. .......... 477/110 |
|---|---|---|---|
| 5,390,117 A | * | 2/1995 | Graf et al. .......... 477/125 |
| 5,557,521 A | * | 9/1996 | Danz et al. .......... 477/43 |
| 5,655,995 A | * | 8/1997 | Kondo et al. .......... 477/155 |
| 5,860,891 A | | 1/1999 | Bäuerle .......... 477/48 |
| 5,906,560 A | * | 5/1999 | Minowa et al. .......... 477/97 |
| 5,967,918 A | | 10/1999 | Knapp et al. .......... 474/28 |
| 6,205,388 B1 | * | 3/2001 | Henneken et al. .......... 701/51 |
| 6,236,925 B1 | | 5/2001 | Gierling et al. .......... 701/53 |
| 6,256,567 B1 | * | 7/2001 | Toukou .......... 477/101 |
| 6,311,114 B1 | * | 10/2001 | Graf et al. .......... 701/51 |

FOREIGN PATENT DOCUMENTS

| DE | 40 37 092 A1 | 5/1992 | |
|---|---|---|---|
| DE | 196 06 311 A1 | 8/1997 | |
| DE | 196 11 431 A1 | 9/1997 | .......... F16H/59/06 |
| DE | 198 45 167 A1 | 4/2000 | .......... F16H/59/18 |
| DE | 199 08 251 A1 | 8/2000 | |
| DE | 198 45 167 | 11/2000 | |

* cited by examiner

Primary Examiner—Sherry Estremsky
Assistant Examiner—Tisha D. Lewis
(74) Attorney, Agent, or Firm—Davis & Bujold, P.L.L.C.

(57) ABSTRACT

Engine torque control system based on the dynamic behavior of a driven automatic transmission consists in that the engine dynamics is limited as function of a sporting mode.

1 Claim, 1 Drawing Sheet

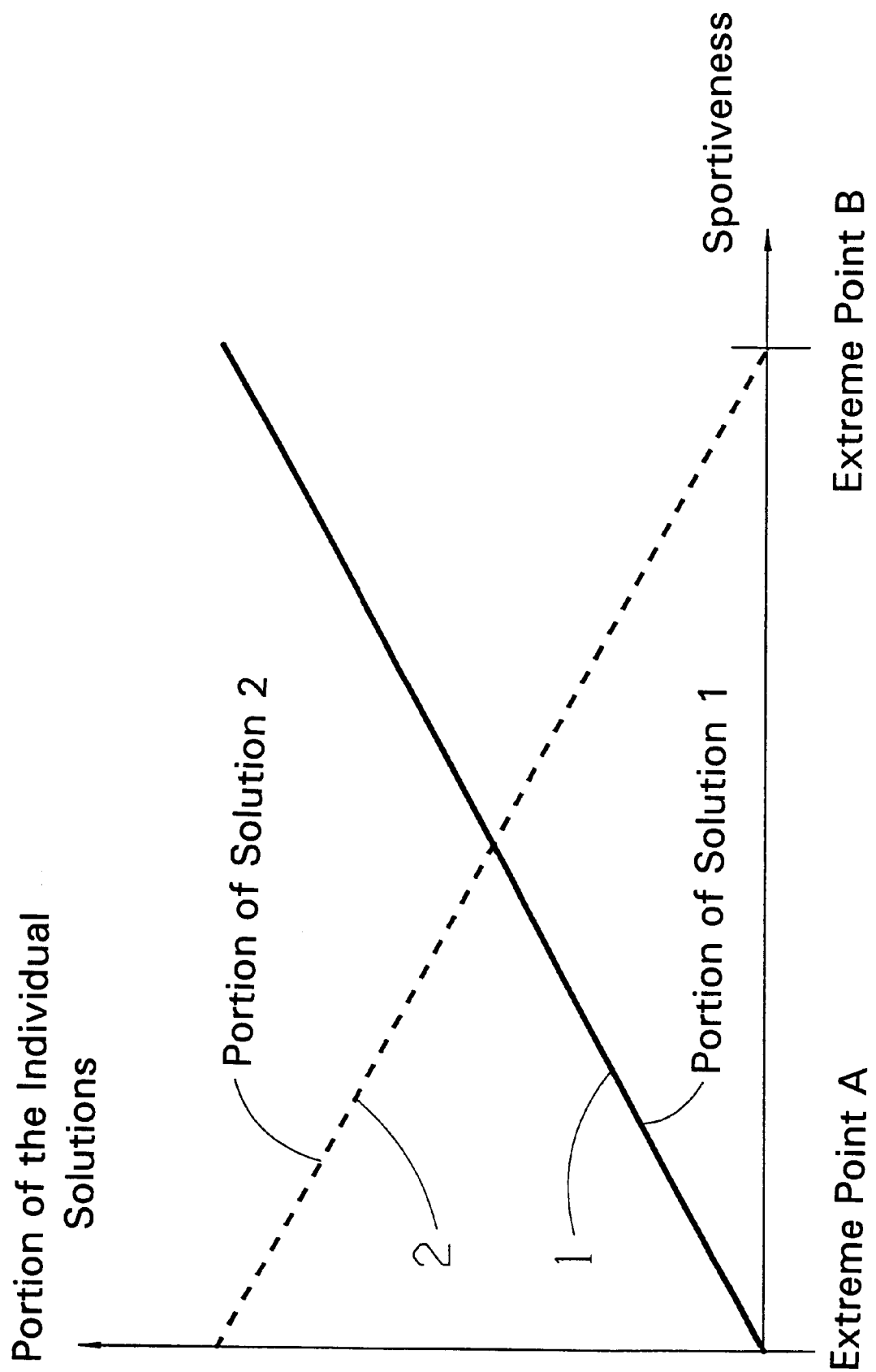

ENGINE TORQUE CONTROL SYSTEM BASED ON THE DYNAMIC BEHAVIOR OF A DRIVEN AUTOMATIC TRANSMISSION

This invention relates to a method for adapting the dynamics of the torque build-up of a motor vehicle to the dynamics of an automatic transmission it drives, which can be designed as continuously variable transmission or continuously variable automatic transmission, by means of pre-conditioning the hydraulic system in the automatic transmission in the sense that the hydraulic pressures be kept within a range from which an increase of the pressures to eventually needed higher pressures is possible in sufficiently short time and by means of reducing the engine dynamics by an external engagement originating from the transmission.

In modern engines of motor vehicles the dynamics of the torque build-up becomes continuously higher. Specially in modern diesel engines for passenger motor vehicles already 60 ms after actuating the accelerator pedal the torque produced thereby can build up on the crankshaft.

The dynamics of an engine cannot be followed by the dynamics of an automatic transmission it drives with the build-up of pressures on clutches in case of a continuously variable automatic transmission or with the build-up of pressures on the adjusting elements for the variator in CVT transmission. Depending on the operating point, starting from which the hydraulic system of the transmission must move, the required contact pressure on the clutches in the case of continuously variable automatic transmissions or frictional elements in the case of continuously variable transmissions cannot be built up with the needed speed in order to cope with the quickly increasing engine torque.

Two method are possible to overcome said disadvantage:
1. Pre-conditioning of the hydraulic system in the automatic transmission for an eventually quickly increasing engine torque, that is, the hydraulic pressures in the hydraulic system of the automatic transmission are kept within a range from which an increase to eventually needed higher pressures can be effected in a sufficiently short time. But this method still has the disadvantage that in low engine torques there is a disadvantage in consumption relative to a pressure level which is based on the actual engine torque and not on an eventually possible engine torque.
2. Reduction of the engine dynamics via an external engagement, that is, the transmission passes on to the engine, for example, via a CAN bus, a signal that only a certain transmission-dependent engine dynamics is admissible.

This method still has the disadvantage of engaging the dynamics of the engine which actually must procure the most dynamic possible and thus sportive impression and has to react as quickly as possible to the driver's requirements.

In the case of a continuously variable transmission, the variator usually is hydraulically controlled, the axial displacement of the cone pulleys meaning a change in volume which must be compensated by the hydraulic system by corresponding flow rate changes in the pair of cone pulleys concerned, since the adjustment occurs under force and pressure control. The change of flow rate to be adjusted by the electrohydraulic control depends here directly on the actual adjustment speed of the pair of cone pulleys. Since the control hydraulics is as a rule supplied via a pump dependent on the engine rotational speed with constructionally predetermined maximum flow rate, there necessarily results also a constructionally fixed limit for the implementable adjusting dynamics of the variator. The variator can be adjusted only as quickly as allowed by the oil flow rate available in the interplay with other control circuits and control loops or consumers.

In the constructional design of the supply pump a part is played, together with ensuring the necessary oil flow rate, aspects such as noise and efficiency both of which act negatively as the size of the pump increases. Based on the variable adjustment speeds of the variator this means that there always exist operating states in which theoretically higher adjustment gradients than allowed by the actual availability of the oil flow rate would momentarily be possible Another aspect is constituted by the design-conditioned limitations (stability of the parts, limit values for control pressures) on the variator which must always be taken into account.

The Applicant's DE-A 199 08 251 discloses a method which by means of a physical mathematical model continuously calculates in each operating state the actual limit values for the maximum possible adjustment gradients. Here are taken into account the special marginal conditions of the oil supply an design-determined geometric ratios on the variator.

A closed loop control structure adequate therefor is described in the Applicant's DE-A 196 06 311 where a physical mathematical linearization of the control system based on a model is combined by means of a correction member with a linear PID controller, the regulated quantity of which is directly interpreted as direction for the adjustment gradient to be set.

In DE-A 40 37 092 is described a method for control of the torque of an engine of a motor vehicle connected with an automatic transmission driven thereby. With the engine is here associated a control electronic system which, on the basis of rotational speed, load and optionally temperature signals, controls the ignition angle of the ignition system and/or the injection pulse width of the fuel injection system. An electronic system associated with the automatic transmission for its part controls on the basis of rotational speed and load requirement signals, shifting operations of the automatic transmission. To improve the control of the whole driving unit with the object of obtaining smooth shifting operations, calculation systems of the transmission control electronics and of the electronics of the engine are always interconnected for communicating via interfaces wherein to the electronics of the engine are fed from the transmission electronics in a cyclic time beat a percent torque requirement based on which the control device automatically modulates the torque of the engine.

For this purpose is used a decentralized microprocessor system in which the separate microprocessors of the control electronics of the engine and of the transmission electronics exchange data via serial or parallel interfaces. Via the interfaces are continuously relayed the actual data of the transmission electronics and corresponding requirements on the control electronics for the engine which thereby can for its part adapt to the transmission electronics. Thereby the transmission electronics can at every moment transmit to the control electronics of this engine in the cyclic time beat a desired torque reduction or torque increase with reference to percent values.

Another method to increase the driving comfort of motor vehicles, especially during load change operation, by modulating the dynamics of the driver's desired torque with an appertaining closed control loop, has been described in the Applicant's older patent application No. 198,45,167.9. To a first microprocessor are here fed signals relative to the accelerator pedal position and to the rotational speed of the engine according to the actual driving mode, the output signal originating from the microprocessor together with a manually adjustable torque requirement signal being fed to a second microprocessor the output signal of which passes through a filter; the filtering time produces a damping of load change and jolt between driver's wish and inner motive reaction after which the output signal of the filter together with other control signals are fed to a third microprocessor the output signal of which together with a torque-limiting signal originating from the transmission electronics are fed to a fourth microprocessor which, after processing the signals, generates control signals for the throttle valve angle, the ignition angle and the injection pulse width. The dynamics of the driver's desired torque is modulated by the electronic transmission control by the fact that the signals originating therefrom are fed to a second filter the output signals of which are fed to the engine control and processed by it.

The invention is based on the problem of providing, for adaptation of the dynamics of the torque build-up of an engine of a motor vehicle to the dynamics of an automatic transmission it drives, a method with which are prevented the disadvantages of the two methods mentioned above, namely, pre-conditioning of the hydraulic system and reduction of the engine dynamics via the external engagement.

Based on a method of the kind described in detail above, this problem is solved with the features set forth in the claim.

The invention provides determining a sporting mode from which is derived a sportiveness factor according to which the portion of pre-conditioning of the hydraulic system and the portion of reduction of the engine dynamics are adjusted as function of the sportiveness factor in a manner such that with a low sportiveness factor the portion of pre-conditioning is minimal and the portion of reduction of the engine dynamics is minimal and with a high sportiveness factor the portion of pre-conditioning is maximal and the portion of reduction of the engine dynamics is minimal and when changing from low sportiveness factor to high sportiveness factor, the portion of pre-conditioning continuously increases and the portion of reduction of the engine dynamics continuously decreases.

The sporting mode here can be determined from the driving strategy, for ex., by the driver's detection, from a driving program or from a manual control signal of the driver.

The invention is explained herebelow with reference to the drawing where in the single figure is shown a graphic representation of the distribution of the portions of pre-conditioning and of reduction of the engine dynamics according to the sportiveness factor.

In this graphic representation, the sporting mode is plotted on the abscissa in the form of the detected sportiveness factor and on the ordinate the portion of the two solutions 1 and 2 described above as first method and second method. As can be seen in the extreme point A, that is, with low sportiveness factor, the solution 2 is fully used, that is, a reduction of the engine dynamics by an external engagement originating from the transmission which, for ex., via the CAN bus, sends a notice to the engine and wherein only a certain engine dynamics is admissible. The transmission is here driven by the pressures into a favorable efficiency range. The engine dynamics is therefor maximally limited insofar as required by the dynamics of the automatic transmission.

As the sportiveness factor increases a change is now more and more effected to the solution 1, that is, the pre-conditioning of the hydraulic system for a quickly increasing engine torque. The dynamics of the engine is thereby continuously less limited for which the automatic transmission must always be more strongly pre-conditioned. In the extreme point B, only the first solution is used, that is, the pre-conditioning. The dynamics of the engine is no longer limited in the extreme point B, but for this the automatic transmission has to be maximally pre-conditioned insofar as required by the dynamics of the engine.

REFERENCE NUMERALS 1 portion of the pre-conditioning
2 portion of the reduction of the engine dynamics

What is claimed is:

1. An engine torque control system based on the dynamic behavior of a driven automatic transmission by means of a pre-conditioning of the hydraulic system in the automatic transmission oriented to keeping the hydraulic pressures within a range from which an increase of pressures to eventually needed higher pressures is possible in sufficiently short time and by means of a reduction of the engine dynamics by an external engagement originating from the transmission, wherein a sporting mode is first determined from which a sportiveness factor is derived and that the portion of pre-conditioning of the hydraulic system and the portion of reduction of the engine dynamics are adjusted as function of a sportiveness factor in a manner such that with a low sportiveness factor the portion of pre-conditioning is minimal and the portion of reduction of engine dynamic is maximal and that with a high sportiveness factor the portion of pre-conditioning is maximal and the portion of reduction of engine dynamics is minimal and when changing over from low sportiveness factor to high sportiveness factor, the portion of pre-conditioning continuously increases and the portion of reduction of engine dynamics continuously decreases.

* * * * *